June 17, 1952 B. H. SMITH 2,601,174
OSCILLATORY MOTOR DEVICE
Filed July 8, 1946 6 Sheets-Sheet 1

Fig. 1.

INVENTOR.
B. H. SMITH
BY M S Pineles
ATTORNEY

June 17, 1952   B. H. SMITH   2,601,174
OSCILLATORY MOTOR DEVICE
Filed July 8, 1946   6 Sheets-Sheet 2

INVENTOR.
B. H. SMITH
BY *M J Pineles*
ATTORNEY

Fig. 2.

June 17, 1952 B. H. SMITH 2,601,174
OSCILLATORY MOTOR DEVICE
Filed July 8, 1946 6 Sheets-Sheet 4

INVENTOR.
B. H. SMITH
BY
ATTORNEY

June 17, 1952  B. H. SMITH  2,601,174
OSCILLATORY MOTOR DEVICE
Filed July 8, 1946  6 Sheets-Sheet 5

INVENTOR.
B. H. SMITH
BY
ATTORNEY

Patented June 17, 1952

2,601,174

UNITED STATES PATENT OFFICE 2,601,174

OSCILLATORY MOTOR DEVICE

Benjamin H. Smith, Bloomfield, N. J.

Application July 8, 1946, Serial No. 681,961

11 Claims. (Cl. 318—134)

This invention relates to electric timing devices, and more particularly to timing devices utilizing an electrically driven oscillating member for providing a predetermined timing motion.

Among the objects of the invention is an electrically actuated timing mechanism of the foregoing type having an energizing circuit connecting it simultaneously to an alternating-current, timed-frequency power system, such as a standard electric power supply system, and also to a direct-current energizing source, such as a battery cell, the timing device being operative to provide the desired timing motion when energized only from the power system or only from the D. C. source.

Another object of the invention is a novel electrically actuated timing mechanism utilizing a mechanically balanced oscillating unit, including a permanently magnetized oscillatory member cooperating with actuating windings energized once during each oscillating cycle of the oscillatory member for imparting to the oscillatory member torque impulses which maintain its oscillatory timing motion, the elements of the timing mechanism being so arranged that the magnetic field of the oscillatory member induces in the windings a counter-electromotive force which reduces the current in the windings at the moment when the energizing circuit is opened during each oscillating cycle.

A further object of the invention is a rotatably mounted timed member forming, for instance, part of a time indicating device, and having a generally circular actuating region arranged for cooperation with a number of electrically actuated, mechanical oscillating and timing units each operating with substantially the same resonance frequency and so designed and correlated in their operation that the complete sequence of oscillating cycles on each of said number of said oscillating units causes said timed member to be advanced by a predetermined step during the period of one oscillating cycle of an oscillating unit.

A still further object of the invention is a timing device capable of delivering substantial power at a timed rate—such as a recording instrument provided with a roll of recording paper on which quantities, such as the voltage variations of an electric power system, are recorded and which requires movement of the paper roll at a timed rate—the timing device being arranged to be driven by drive means, including a motion transmission mechanism connected to a timed member so as to apply to the timed member driving forces of substantial power tending to rotate said member, and in combination therewith a timing unit, including an electrically actuatable, mechanical oscillating unit for controlling the rate at which said transmission mechanism applies driving power to said timed member, said oscillating unit being connected to said transmission mechanism through preventive means preventing said transmission mechanism from applying driving forces to said oscillating mechanism.

The foregoing and other objects of the invention will be best understood from the following description of exemplifications thereof, reference being had to the accompanying drawings, wherein—

Figs. 1-A to 1-C, inclusive, are diagrammatic views showing three modified forms of energizing circuits for a timing device exemplifying the invention;

Fig. 4-A is a detail view of the ratchet arrangement of Fig. 4.

Although various types of electrically driven timing mechanisms operating with an oscillatory timing member have been proposed and manufactured in the past, they all exhibited certain deficiencies which limited their general acceptance. In particular, there has long existed a wide field of usefulness for electrically driven timing mechanisms which could be operated both from a standard alternating current supply source as well as from a direct current source, such as a dry cell or rechargeable D. C. battery. Thus, standard electric clocks operated by alternating current from the electric power supply systems extending all over the country, exhibit an inherent deficiency because, in the event of a failure of the electric power supply—a frequent occurrence in districts away from large power centers—the clock will stop.

The timing mechanism of the present invention utilizes an electrically driven oscillatory member, the elements of the timing mechanism being so arranged as to make it possible to secure the desired timing action by supplying electric energy either from a D. C. source or from an alternating current power supply.

Figure 1:
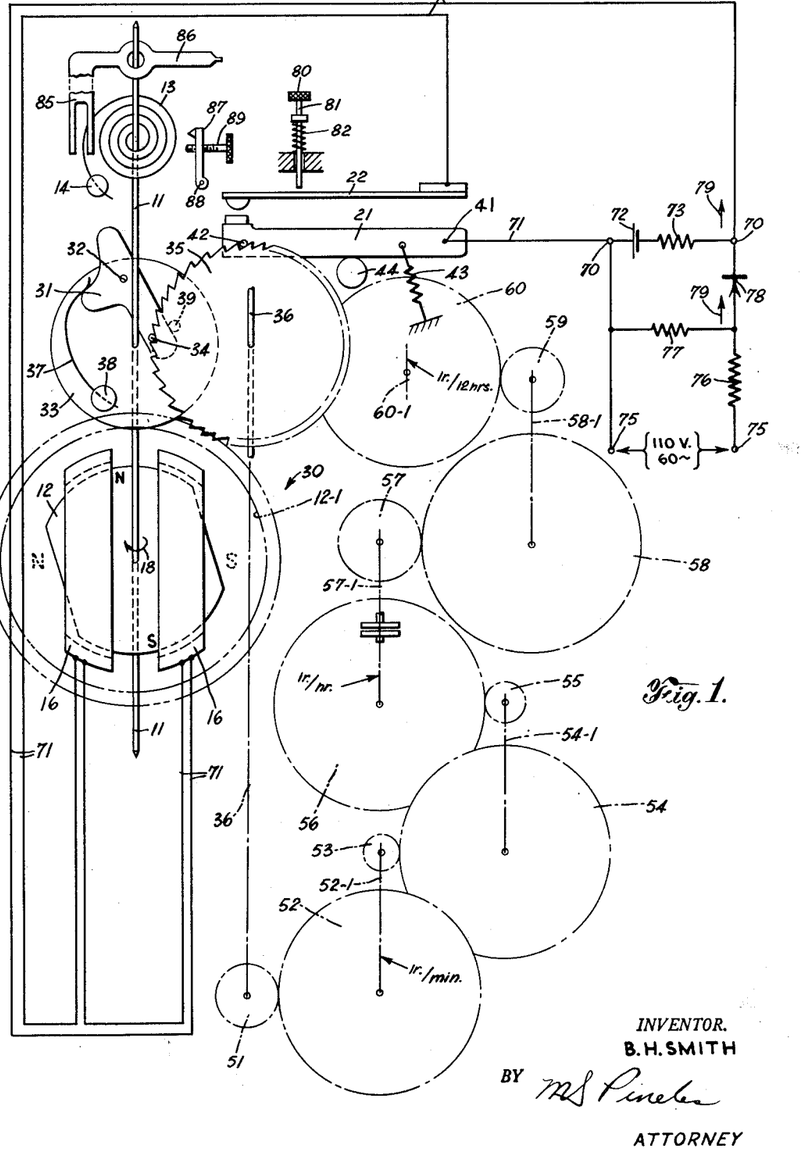
Fig. 1 is a diagrammatic view showing the cooperative relationship of the principal elements of one timing mechanism exemplifying the invention together with the electric energizing circuit for supplying electric operating energy to the driving elements of the timing mechanism.

One form of a timing mechanism based on the principles of the invention is shown diagrammatically in Fig. 1. It comprises an oscillating mechanism, generally designated 30, having an oscillating shaft 11, suitably journalled in bearings of a fixed supporting frame, and which has fixedly mounted thereon an oscillatory mass member 12, performing the function of a balance member of the type used in spring driven clocks and arranged for cooperation with a hair spring 13, one end of which is affixed to the shaft 11 and the other end of which is secured to a post 14 adjustably mounted in the fixed supporting frame.

In accordance with the invention, the oscillatory member 12 is made of a magnetically retentive or permanently magnetizable material, such as sintered Alnico powder, and it is arranged to produce a magnetic field along the exterior of the peripheral pole regions N and S. The permanently-magnetized oscillatory member 12 is arranged to cooperate with current-carrying windings, shown in the form of two winding coils 16, so disposed that when a current of a predetermined direction is sent through the coil windings, the resulting magnetic field produced by the current will impart to the permanently-magnetized oscillatory member 12 a torque which causes the oscillatory member to rotate in what may be designated as a forward direction, indicated in Fig. 1 by an arrow 18.

In a practical timing mechanism of the invention designed to be driven by energy from a 60-cycle alternating power supply system, the mass of the oscillatory member 12 and the associated oscillatory structure is so correlated to the stiffness of the hair spring 13 that they form an oscillating system having a resonant frequency which is a definite submultiple of the 60-cycle frequency. Thus, in a practical clock mechanism of the invention, the operating system formed by the oscillatory structure 12 and the hair spring 13 is designed to have a resonant frequency of four cycles per second, at which one oscillating cycle of the oscillatory member has a duration equal to 15 cycles of a 60-cycle alternating current power supply.

The combination of the oscillating system and energizing windings arranged in the manner described above, is combined with an energizing circuit including contact means shown in the form of two contact members 21, 22 arranged to be actuated by the oscillating member during a part of each oscillating cycle so as to send through the windings a current impulse which imparts to the oscillating member a driving impulse in the forward direction. More particularly, the contact mechanism is so correlated with the operation of the mechanical oscillating system as to cause the coil winding 16 to receive a current impulse imparting to the oscillating member a driving impulse in forward direction only during a part of the forward oscillating cycle of the oscillating member.

In other words, the oscillating system is so combined with the contact mechanism that the contacts are closed only while the oscillating member is moving in the forward direction, and that the contact mechanism keeps the windings de-energized during the return motion or return part of the oscillating cycle. Furthermore, the energizing windings, oscillator member and contact mechanism are so designed, positioned and correlated that when the winding is energized by the contact mechanism during a part of the forward oscillating cycle of the oscillating member 12, the external field of the permanently magnetizable member 12 induces in the windings a counter-electromotive force which reduces the current in the winding at the moment the contact mechanism opens the winding energizing circuit for substantially suppressing any sparking that is caused by a current interruption.

In other words, the timing mechanism is arranged to operate in such manner that the counter-electromotive force induced in the windings by the oscillatory movement of the oscillating member 12 during its forward oscillating cycle, reduces the current in the winding circuit to the minimum level required to maintain oscillations, thereby avoiding dissipation of surplus energy in the winding circuit and at the contact points which took place in prior art timing devices driven by electric impulses.

In the form of the invention shown diagrammatically in Fig. 1, the oscillatory motion of the oscillatory member 12 is transmitted to the contact mechanism 21, 22 by means of a pawl structure 31 pivotally connected through a pivot 32 to a roller table or supporting disk 33 which is affixed to the oscillating shaft 11, the pawl 31 being provided with a tooth projection or pin 34 arranged to engage a tooth of a ratchet wheel 35 supported on a shaft 36 suitably journalled in the frame structure of the mechanism. A biasing spring 37, one end of which is held by a post 38 of the roller table 33, biases the pawl 31 so that its pin projection 34 is urged into engagement with a tooth of the ratchet wheel 35.

The pawl and ratchet elements of the mechanism described above are so designed and correlated to the other elements of the oscillating mechanism that during each forward oscillating movement of the oscillating member 12, the pawl 31 will, by its tooth pin 34, advance the ratchet 35 by one tooth, the return oscillatory motion of the oscillating member causing the pawl to be withdrawn while its tooth pin 34 rides over the inclined surface of the next ratchet tooth until it drops into the next tooth slot. Each forward step imparted to the ratchet wheel 35 is utilized to actuate the contact mechanism to close its contacts during a part of the forward oscillating cycle of the oscillating member 12.

In the arrangement shown, this is accomplished by providing contact member 21 with a pivotal support 41 and a tooth projection 42 shown in the form of a pin engaging another tooth portion of the ratchet wheel 35 so that each time the ratchet wheel 35 is advanced by one tooth, the pin projection 42 of the contact arm 21 will be actuated by a tooth of the ratchet wheel to momentarily close the two contacts 21, 22 while the pin 42 rides over the top of the tooth engaged thereby, the contacts being opened when the pin projection 42 is returned into the slot of the next tooth by the action of the biasing means indicated by the biasing spring 43.

As indicated in Fig. 1, the tilting motion of the pawl 31 imparted thereto by the biasing spring 37 is stopped by a stop pin 39 suitably mounted in the roller table 33. In an analogous manner, the pivotally mounted contact arm 21 is limited in the movement imparted thereto by the biasing spring 43 by a stop post 44. The stop pin 39 for the pawl 31 has an exterior surface region of a damping material, such as fibre, and is so positioned that when the pin projection 34, after passing the crown of a ratchet tooth, drops into the next tooth slot, the pawl 31 will be stopped by the stop 39 before the pin projection 34 of the pawl can reach the bottom of the tooth slot.

Furthermore, the stop pin 39 is so located and arranged that when, in the course of the subsequent forward motion of the pawl 31, the pawl pin 34 engages the generally radial working surface of the facing ratchet tooth, it will not come into engagement with the bottom portion of the tooth slot and thereby avoids friction and the losses connected therewith.

In addition, the stop pin 44, limiting the return motion of the contact arm 21, is provided with an exterior surface region of damping material arranged so that when the pin projection 42 of the contact arm 21, after passing the crown of an advancing ratchet tooth, is released into the next tooth slot, the contact arm 21 reaches the damping surface of the stop member 44 before the pin projection 42 can reach the bottom of the tooth, thus eliminating noise and wear.

A practical form of a timing mechanism of the type shown in Fig. 1 was designed so that the oscillating member 33 performs four double oscillations per second so that its operation causes the ratchet member 35 to be advanced by four teeth in one second. The ratchet member 35 is designed with sufficient teeth, namely, 40 teeth, so that when the oscillating member 33 oscillates at a frequency of four cycles per second, the shaft 36 of the ratchet wheel 35 will make one turn in ten seconds. In other words, the oscillating member mechanism 33 and the associated ratchet member 35 were designed to operate with speed ratios analogous to those of the balance and escapement elements of a standard spring-wound clock.

Accordingly, the rotary motion imparted to the ratchet shaft 36 by the oscillating system 33 of the timing mechanism shown in Fig. 1 may be utilized in connection with a gear train system of the type used in standard spring-wound clocks for imparting the proper rate of rotary motion to the time indicating hands of a standard clock. Thus, as indicated in Fig. 1, the ratchet shaft 36 may be utilized to drive through gears 51, 52 a shaft of the second hand affixed to gear 52. The rotary motion of the shaft of gear 52 may be transmitted through a gear train 53, 54, 55, 56 to the shaft of gear 56 for rotating it at the rate of one revolution per hour and to which the minute hand of the clock is affixed.

Furthermore, as indicated in Fig. 1, the minute-hand shaft of gear 56 may be utilized to drive through a friction clutch and a gear train 57, 58, 59, 60 the shaft of an hour hand which makes one revolution in twelve hours and to which the hour hand may be affixed for indicating the hours, as in a standard clock.

In accordance with the invention, a timing mechanism of the type described above is utilized to be driven either by energy from a D. C. source or an A. C. source or both by an A. C. and D. C. source. By operating such timing mechanism by an energizing circuit connected simultaneously to a D. C. source and a standard A. C. power supply, such timing mechanism will continue to indicate the time even if the power supply fails, as is often the case in electric power supply districts which are remote from power centers.

Since the balance member 33 and the ratchet 35 which supply the driving forces for the timing mechanism operate at a relatively low speed comparable to the speed of the balance and escapement of a standard spring-wound clock, it enables the provision of a clock operated from a standard 60-cycle electric power supply, without requiring a high reduction gearing between the time indicating elements and the electric motor unit of the type commonly used in electric clocks driven by 60-cycle electric power.

As indicated in Fig. 1, the windings of the two coils 16 and the contactor elements 21, 22 of the timing mechanism are interconnected through leads 71 to two instrument terminals 70 which are supplied by electric energy from a D. C. source shown in the form of one cell of a D. C. battery 72 connected in series with a resistance 73 to the two instrument terminals 70. In addition, the two instrument terminals 70 are shown supplied from a standard alternating current power supply, such as a conventional domestic power supply outlet indicated by the power terminals 75, the connections between the power terminals 75 and the instrument terminals 70 including two series resistances 76, 77 so that only a fraction of the voltage of the power supply line appearing across the resistor 77 is applied through a rectifier 78 to the instrument terminals 70, so that the rectified A. C. voltage component impressed across the terminals 70 tends to send through the supply leads 71 of the instrument a current in the same direction as the D. C. source 72, indicated by the arrows 79.

For most practical purposes, the permanently magnetized oscillatory member 12 is utilized without providing for it a magnetic core return path. However, if a more efficient electromagnetic driving structure is required, a magnetic core return path should be provided, for instance, in the form of a magnetic core ring 12—1, indicated in Fig. 1 by dash two-dot lines, which is affixed to the shaft 11 as by an end bell not shown, so that the two concentric core members 12, 12—1 oscillate as a unit. The two core members 12, 12—1 are so arranged that the pole regions N, S of the inner core member 12 are spaced from the facing periphery of the core ring 12—1 by a circular air gap region through which the active portions of the fixed actuating coils 16 extend.

The inner permanent-magnet oscillator core 12 may be made either with a circular periphery or in the form of an oblong member, as shown, to facilitate the mounting of the winding coils 16 in their fixed operative positions shown.

Figure 2:
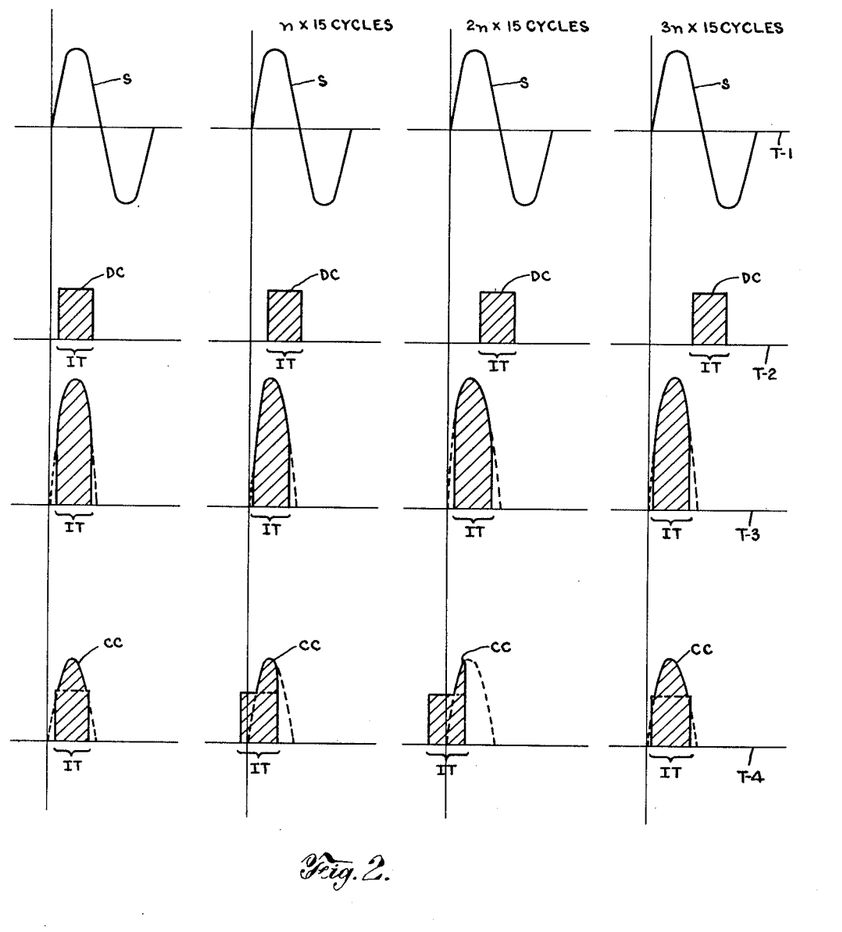
Fig. 2 is an explanatory curve diagram showing the time relation of the current impulses supplied to the timing mechanism under various operating conditions.

The curve diagram of Fig. 2 shows in a general way how a timing mechanism of the invention is energized at spaced intervals of a multiple of 15 cycles of the alternating current supply, a 15-cycle A. C. interval being equal to one operating cycle of the mechanical oscillating system 30 of the timing mechanism.

In the diagram of Fig. 2 there are shown along the upper time axis T-1 the sign wave elements of a standard 60-cycle sine wave spaced by long time intervals of a multiple of 15 cycles ($n \times 15$ cycles) corresponding to the intervals between a succession of moments at which the mechanical oscillating system of the timing mechanism shown in Fig. 1 will operate to close and open its contacts.

*Operation with D. C. only.*—In the curve diagram of Fig. 2 the series of current waves DC along the time axis T-2 indicates the general form of the current impulses supplied by the D. C. source 72 to the actuating windings 13 of the timing mechanism during energizing intervals IT spaced by a period of approximately $n$ times 15 cycles of a 60-cycle A. C. power system when the contacts 21, 22 momentarily close the energizing circuit from the D. C. source 72 to the actuating windings.

It will be noted that the direct current impulses DC sent through the windings are shown displaced in phase against the 60-cycle standard timing wave along the timing axis T-1, indicating that the clock-work is operating somewhat slower than the standard timing wave, in a way exaggerated for the sake of simplicity. This slower operation of the timing mechanism may be caused by factors such as a difference in the resonant frequency or by variations in the frictional load and temperature of the elements of the timing mechanism.

If the phase displacement is caused only by variations of the frictional load and similar factors, the timing mechanism may be brought to correct timing by slightly raising the D. C. voltage applied by the D. C. source to the actuating windings. When the voltage applied to the windings is raised, the increased current impulses delivered to the windings each time the energizing contacts are closed will impart to the oscillating member 33 a greater oscillation amplitude, and thereby cause it to speed up.

*Operation with A. C. only.*—When the actuating windings are supplied with current impulses from the A. C. source only, with the D. C. source, such as cell 72, disconnected from the operating circuit, the current impulses supplied to the actuating windings, during the intervals IT when the contacts 21, 22 complete the energizing circuit, will correspond to the curve elements AC along the timing wave T-3 of the curve diagram of Fig. 2.

As long as a sufficiently high voltage is applied by the energizing circuit to the windings 16, the current impulses delivered thereto will be sufficient to maintain the clock in synchronism with the A. C. wave of the system, although the mechanical load to which the timing mechanism is subjected may vary in such manner that when operated from a D. C. source only, the timing mechanism would slow down in the manner explained above for operation with D. C. only in connection with the current impulses along the timing axis T-2 of Fig. 2.

It will be noted that when operating with alternating current only, as indicated on the timing axis T-3, the current impulses delivered to the actuating winding during each interval when the contacts 21, 22 complete the energizing circuit, form only a part of one-half of the alternating wave. However, depending on the adjustment, the timing mechanism will also operate if each interval during which the contacts 21, 22 complete the energizing circuit to the actuating winding 16 is somewhat larger than the period of one-half cycle of the alternating current supply.

*Operation with D. C. and A. C. impulses.*—The timing mechanism shown will also operate when it is simultaneously energized by a D. C. source, such as a dry cell 72, and a conventional alternating current supply line, as indicated in Fig. 1, in which case the current impulses delivered to the actuating windings 16 during each interval of its energization by the closure of the energizing contacts 21, 22, will conform to the shape of the full-line curve elements CC indicated along the timing axis T-4 of Fig. 2.

It will be noted that under such operating conditions, the current delivered to the actuating windings 16 during each energizing interval IT from the combined A. C.-D. C. supply source, is partially supplied by the A. C. source and partially by the D. C. source. It should be noted that the duration of the energizing intervals IT, indicated along the several time axes T-2, T-3, T-4, may vary in length, for instance, if a higher supply voltage is applied and the energizing current is larger, because the amplitude of the oscillations of the oscillating member 12 will be larger, in which case the energizing interval IT, during which the contacts 21, 22 energize the actuating windings, will be shorter.

The circuit parameters of the energizing circuit connections from the A. C. source and the D. C. source to the actuating windings are so adjusted that the A. C. voltage applied to the actuating windings is sufficiently larger than the D. C. voltage as to assure that the A. C. current impulses supply the major part of the driving energy to the timing mechanism. In order to assure stable operation under such operating conditions, the mechanical oscillating system of the mechanism is adjusted so that when it is energized only from the D. C. source 72, it has a tendency to operate at a speed slightly less than the synchronous speed corresponding to the 60-cycle power supply indicated along the timing axis T-1.

As indicated along the time axis T-4 of Fig. 2, under such conditions, the alternating current impulses supplied to the actuating wave may tend to slightly advance the phase of the current impulses during some of the energizing cycles as indicated, for instance, at the energizing impulses supplied at $n \times 15$ cycles and at $2n \times 15$ cycles, the alternating current impulses serving to maintain the clock in synchronism with the frequency of the alternating current system.

In order to enable those skilled in the art to practice the invention, there are given below operating data of a practical timing device of the type described above:

The oscillating or balance member 33 was of a diameter of about one-half inch and a thickness of about one-tenth of an inch.

It formed in combination with the hair spring 13 and the other mechanical elements connected thereto an oscillating system which had a resonant frequency of about four cycles per second.

The actuating winding 16 consisted of two stationary coils of approximately 75 turns each of No. 42 wire.

The D. C. source 72 consisted of a standard D-size flashlight cell.

The resistance 73 in series with the D. C. cell was about 100 ohms.

The series resistance 76 in the A. C. supply line was approximately 5000 ohms and the other series resistance 77 was approximately 300 ohms, the ratio of the two resistances being so chosen as to apply an A. C. voltage component of approximately three volts at the terminal 70 after passing through the rectifier 78.

The rectifier 78 was a standard half wave instrument type copper-oxide rectifier element.

A timing mechanism of the type shown is not normally self starting. However, it may be started by imparting a mechanical impulse to the balance wheel, for instance, by shaking it. Alternatively, the timing mechanism may be provided with starting means of the type commercially used in spring-driven balance wheel clocks. Furthermore, as indicated in Fig. 1, the timing mechanism may be provided with starting means in the form of a push button starter pin 81 mounted so that upon actuating the button 80 exposed on the exterior of the starting mechanism, the starter pin will momentarily close the energizing contacts 22, the starting pin being returned to its normally released position by a conventional biasing spring 82.

The permanent magnet member 12, the actuating windings 16 and the contacts 21, 22 are so arranged in their cooperative relation that the energizing circuit is closed slightly before the moment when the pole axis of the permanent magnet 12 reaches the mid-position of the oscillation amplitudes, the circuit of the energizing windings being opened shortly after the closure, while the permanently magnetized member 12 is moving with a substantially maximum velocity and its strong magnetic field is highly effective in inducing in the windings 16 a counter-electromotive force which reduced the current through the windings to a substantially negligible level so as to substantially suppress contact sparking. The several elements of the system may be readily adjusted so that the energizing current through the windings 16 is of such direction that the magnetic field produced thereby has such direction and a polarity so correlated to the polarity of the permanent magnet member 12 as to exert thereon a torque tending to impart thereto a motion in the forward direction, indicated by the arrow 18. Thus, assuming that the permanent magnet member has the polarity indicated by the full-line symbols N, S applied to its pole regions, the field produced by the current through the windings should have a polarity indicated by the dash-line symbols N, S.

The timing device of the invention may be readily designed for highly efficient operation, so that it requires only an extremely small amount of electric operating power. Thus, a practical timing device of the invention, when operated only from a single direct-current dry cell of 1.5 volts, such as used in flashlights, the average direct current drain from such cell is only approximately one milli-ampere, and such cell is able to supply this small amount of electric driving energy throughout the full length of its shelf life. When the timing device of the invention is operated with energy from the alternating-curent power system as well as a dry cell, it will operate in the manner indicated along the timing axis T-4 of Fig. 2, with an average alternating current drain of about one milli-ampere when about 2 volts of a 60-cycle alternating current source are applied to the energizing circuit across the terminals of the voltage-dividing resistor 77, while the dry cell 72 of about 1½ volts is connected in the energizing circuit.

As pointed out above, when the energizing circuit operates to connect a timing device of the invention both to the electric alternating current power system and to the D. C. source, it is desirable that the resonant frequency of its mechanical oscillating system should be slightly less than its synchronous frequency at which it will oscillate when it is energized by the rectified current impulses supplied thereto from the timed alternating current power system, in the manner indicated along the time axis T-4 of Fig. 2. A practical timing device of the invention is effectively stabilized to oscillate in synchronism with the frequency of the alternating power system if the resonant frequency of its oscillating unit is such that when energized from a D. C. source only, it will lose only a few seconds in a 24-hour period.

As indicated in Fig. 1, the hair spring 13 of the mechanical oscillating system described is provided with a fork element 85 carried by a setting arm 86 mounted co-axially with the shaft 11 of the oscillating member for pivotally adjusting the angular position of its fork element 85. The adjusting member 86 with its fork element 85 is generally similar to the fast-slow adjustment member used in conventional balance wheel clocks. However, in the timing mechanism of the type shown, the two fork arms of the fork element 85 are arranged so that they are more widely separated than those used in conventional balance wheel clocks, the spacing being such that when the oscillating member 37 oscillates with a relatively small amplitude, the coil turn of the hair spring passing between the fork arms will barely touch or come into engagement with the facing sides of the fork arms when the element oscillates and to assure that when the oscillating member 33 oscillates with a greater amplitude, the coil turn of the hair spring will alternately establish engagement with the two facing arms of the fork element 85 during a longer portion of each oscillating period.

In timing mechanisms of the invention designed to be simultaneously energized from an A. C. and D. C. source, the spacing of the fork arms 85 and their location and adjustment relatively to the hair spring 13 are so designed and chosen that when the timing mechanism is energized only by the D. C. source, it will operate at a speed slightly less than the synchronous speed corresponding to the alternating current supply line in order to assure that the energizing impulses received from the A. C. source shall increase the amplitude of the oscillations and bring the oscillating mechanism into synchronism with the A. C. supply line in the manner explained in connection with the time axis T-4 of Fig. 2.

By increasing the time during which the hair spring 13 maintains engagement with the arms of fork 85 during each oscillation period when oscillating with a larger amplitude, the hair spring 13 will operate effectively with a greater stiffness, thereby raising the resonant frequency of the oscillating system which it forms with the mass of the oscillating member 33, so that it corresponds to the frequency of the alternating current system.

Alternatively, the fork element 85 may be modified so that it performs only the functions of a conventional fast-slow adjustment, in the manner indicated in Fig. 1-A in which the adjusting fork element 85—1 has two close prongs engaging the hair spring. In order to introduce the additional stiffness into the oscillating system when its oscillating member swings with greater amplitude, there is provided an additional spring element shown in the form of spring element 13—1 similar to the hair spring and affixed to the oscillating shaft 11, the spring 13—1 having a portion 13—2 which may be formed by its free end arranged so that whenever the oscillating member with its shaft 11 oscillates with a larger amplitude, the spring portion 13—2 comes into engagement with portions of two abutment members 14—1, so as to increase the stiffness of the compliant elements of the oscillating system.

Alternatively, the two spaced abutment members, such as 14—1, may be carried by the roller table 13 or another part of the oscillating structure and arranged to come into engagement with the arm 13—2 of a spring, such as spring 13—1, the other end of which is suitably held on an adjustable support of the frame structure, for similarly increasing the resonant frequency of the oscillating system.

As indicated in Fig. 1, an arm 87 pivotally mounted at 88 on a fixed support and adjustable, as by a knurled head screw 89, may be arranged so that whenever the oscillating member with its shaft 11 oscillates with a larger amplitude, the hair spring 13 comes into engagement with a projecting abutment of the arm 87 so as to increase the stiffness of the compliant elements of the oscillating system and thereby increase the resonant frequency of the oscillating system in the manner explained above.

In Fig. 1-B is shown another way for operating a timing mechanism of the type described in connection with Fig. 1 with energy supplied from a D. C. source as well as an A. C. source. A timing mechanism 10 of the type described in connection with Fig. 1, is shown connected to be supplied by energy from a D. C. source shown in the form of a battery 11 and a 60-cycle alternating current supply source indicated by supply terminals 75. Two series resistor elements 76, 77 are connected between the A. C. supply terminals 75 and the resistor element 77 is connected across the instrument terminal 70 in series with the D. C. supply cell 11 so as to impress on the instrument circuit the voltage of the D. C. and a superimposed component of the A. C. source.

With such circuit arrangement, the D. C. cell 11 will be subjected to a larger current drain than with the arrangement of Fig. 1. A timing mechanism of the type described in Fig. 1 will synchronize with the alternating current supply system if the A. C. voltage developed across the resistor 77 is even less than the voltage of a D. C. source.

In accordance with another phase of the invention, timing mechanisms operating with an oscillatory balance system of the type described above and designed to be energized simultaneously from an A. C. source and a D. C. source, are arranged so that, when operated from a D. C. source only, their mechanical oscillating systems will operate with a resonant frequency which secures a timing action that is substantially in synchronism with the frequency of the alternating power supply, and that when the timing mechanism is connected both to the D. C. supply and to the A. C. supply, one of the parameters of the mechanical oscillating system of the timing device is modified so as to cause it to have a resonant frequency slightly smaller than the resonant frequency of the A. C. supply in order to assure that the A. C. energy impulses effect stable synchronization of the timing mechanism in the manner described in connection with the timing axis T-4 of Fig. 2.

In Fig. 1-C is shown another arrangement for operating a timing mechanism of the type described in connection with Fig. 1 with energy supplied from a D. C. source, as well as an A. C. source. A timing device 10, similar to that of Fig. 1, has an actuating winding 16 and energizing contacts 21, 22 for energizing the winding whenever the contacts 21, 22 are momentarily closed by the operation of the oscillating member 12. Energy from an alternating power source connected to power supply terminals 75, is supplied to the timing device through a stepped-down transformer 77—1. The secondary winding of the transformer 77—1 is connected in series with a dry cell battery 72 to the supply terminals 70 of the timing device. Furthermore, a rectifier element 78 is connected in the circuit between the secondary winding of the transformer and the battery 72 so as to prevent the battery from discharging through the secondary winding.

A timing device of the invention provided with an energizing circuit of the type described in connection with Fig. 1-C is of advantage whenever it is desired to operate the timing device with substantial power in order to impart to the timing mechanism strong mechanical timing impulses. In the arrangement shown in Fig. 1-C, the rectifier 78 is utilized only to prevent the D. C. source or cell 72 from discharging through a circuit connected through the secondary winding of the transformer along a path parallel to the energizing circuit of the timing device.

In general, timing devices of the invention, of the type described in connection with Figs. 1 and 2, will operate with extremely small power requirements. Thus, when the device is operated only from the D. C. cell, the D. C. current drain from a 1½ volt cell is only approximately 1 milliampere. When such timing device is arranged to be supplied both from a conventional 60-cycle alternating current line of 110 volts and a dry cell of 1½ volts, in the manner indicated in Fig. 1, it will operate in the manner indicated along the timing axis T-4 of Fig. 2, with an A. C. current drain of approximately 1 milliampere when the A. C. voltage of about 2 volts is applied across the terminals 70.

The timing device of the invention may be operated also so as to provide more powerful timing force by energizing it through a circuit arrangement described in connection with Fig. 1-C. This is made possible because the circuit through which the energizing impulses derived from the alternating current supply are delivered to the actuating winding 16 of the timing device, does not include as a series impedance element 73, which represents a substantial impedance.

The timing device of the invention is very effective in inducing in the energizing windings a counter-electromotive force which reduces the energizing current to negligible value or substantially zero at the moment the energizing contacts open. Accordingly, the timing device of the invention will operate efficiently without contact sparking and contact wear for a much longer period than prior art devices utilizing periodically operated energizing contacts for supplying operating energy to the timing device.

In the timing device of the invention, the contact member 22 is carried on a leaf spring which may be mounted on a fixed support adjustable to secure proper timing of the moment when the energizing contacts open and close, as a result of the pivotal movement imparted to the cooperating rigid contact member 21 by the operation of the ratchet wheel 35.

Figure 3:
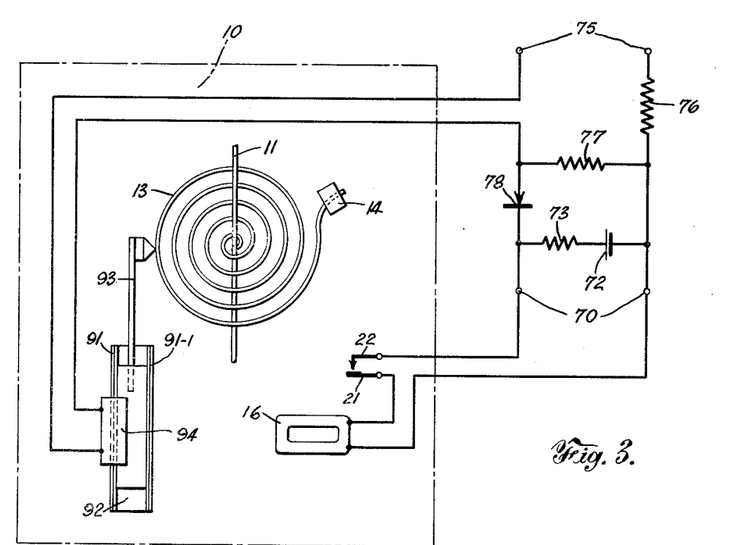
Figs. 3 and 3-A are diagrammatic views of two further modifications of timing devices exemplifying the invention.

Fig. 3 shows one form of such timing device arrangement exemplifying the invention. A tim- According to another phase of the invention, a plurality of mechanical, electrically-energized oscillatory timing systems of the general type described in connection with Fig. 1 are combined to operate in sequence for imparting a timing action to a common timing member so that the driving forces imparted to the common timing member are multiplied and more continuous, the resulting effect being similar to that obtained with a multi-pole, slow-speed alternating-current synchronous motor.

Figure 4:
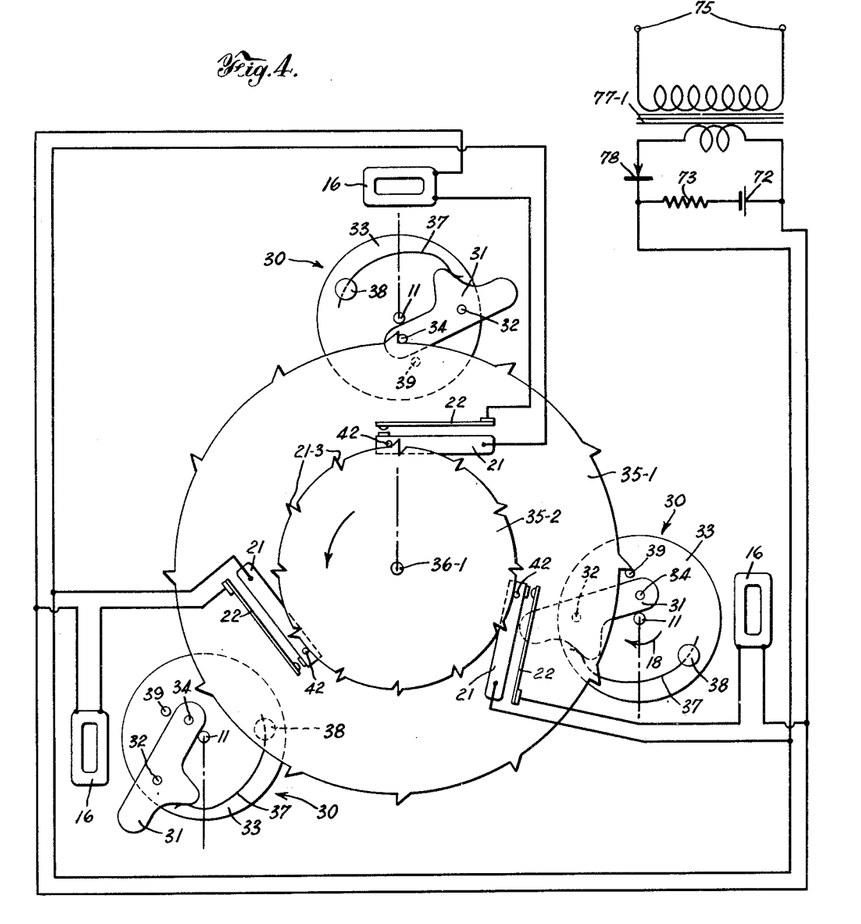
Figs. 4 and 4-B are diagrammatic views of two forms of timing devices exemplifying the invention.

Fig. 4 illustrates diagrammatically one form of such timing arrangement of the invention. A common timing member, represented by a revolvably mounted timing shaft 36—1 corresponding to the ratchet shaft 36 of Fig. 1, carries ratchet elements shown in the form of two ratchet wheels 35—1 and 35—2, arranged for cooperation with the oscillating member and contactor member of each of a plurality of mechanical oscillating systems or units 30, such as described in connection with the timing mechanism shown in Fig. 1.

For the sake of simplicity, each of the oscillating mechanisms 30 of the device of Fig. 4 is indicated by an actuating winding 16 which imparts oscillations to an oscillating member having an oscillating roller table 33 affixed to its shaft 11 and carrying the spring-biased, pivotally mounted pawl 31. The pawl 31 carries a pawl pin 34 arranged so that during the forward oscillating motion of the roller table 33 and magnetic oscillating member 12, in the direction indicated by the arrow 18, the pawl projection 34 will engage one of the teeth of the ratchet wheel 35—1 and advance it by one-third of the pitch or spacing between the teeth of the ratchet wheel 35—1.

The actuating winding 16 of each oscillating unit 30 is arranged to be energized by the operation of its contacts 21, 22 each time the ratchet wheel 35—1 is advanced by the forward oscillation of its oscillating member 12. Although the contacts 21, 22 may be arranged to be closed during the short energizing interval of the forward oscillation by the teeth of the ratchet wheel 35—1, they are shown operated by a separate ratchet wheel 35—2 having the same number of teeth as the ratchet wheel 35—1, both affixed to a common revolvably mounted shaft 36—1 corresponding to the ratchet shaft 36 of Fig. 1. Each contact operating tooth of the ratchet wheel 35—2 corresponds to a ratchet tooth of the ratchet wheel 35—1 and is arranged to close for a short interval the contacts 21, 22 of the corresponding oscillating unit during a fraction of the half-cycle period of the forward oscillating motion of its oscillating member 12, as explained in connection with Figs. 1 and 2.

The several mechanical oscillating units 30 associated with the common timing member, shown formed by the shaft 36—1 with its two ratchet wheels 35—1 and 35—2, are so positioned relatively to the teeth of the ratchet members 35—1, 35—2 that they operate in succession to successively advance the timing member by one-third of the angular pitch or spacing of the successive ratchet teeth of the two ratchet wheels 35—1, 35—2. In other words, the three mechanical oscillating units 30 are so arranged as to require one cycle of operation of each of the three oscillating units in order to advance the timing member formed by the ratchet wheels 35—1 and 35—2 by one complete tooth.

Depending on the number of mechanical oscillating units, such as 30, utilized for imparting the successive advancing impulses to the common timing member, the timed advancing impulse supplied by several mechanical oscillating units have to be phase-displaced relatively to each other by the corresponding fraction of one full oscillation cycle of the oscillating unit 30, it being understood that the several oscillating units of the device are designed to operate with substantially the same resonance frequency or natural period. In other words, a timing device provided with the three oscillating units 30, such as described in connection with Fig. 4, will operate in such manner that the ratchet wheels of shaft 36 will first be advanced by one oscillating unit 30 by one-third of the tooth spacing; thereupon the second oscillating unit 30 will advance it another one-third of the tooth spacing after the proper time phase interval, whereupon the third oscillating unit 30, after a further proper time phase interval, will advance the timing member by another one-third of the tooth spacing, a similar sequence of three advancing steps being repeated within the period of one full oscillating cycle of such oscillating unit 30.

The toothed periphery of the ratchet wheel 35—2 which is utilized to operate the contact elements 21, 22 of the several oscillating units, is so shaped as to provide a detent notch 21—3, as indicated in the detail view Fig. 4-A, on the portion of each tooth slot adjoining the side of each tooth which releases the contacts 21, 22 from the closed to the open position, after having been first closed during the short energizing interval of the oscillating unit 30. This detent notch arrangement will cause the pin projection 42 of the contact arm 21 to drop into the detent notch 21—3, as indicated in Fig. 4-A, thereby detaining the timing member of the ratchet wheels 35—1, 35—2 in the position to which it was just advanced. In other words, the operating pin 42 of the contact arm of each oscillating unit acts not only as a tooth follower in operating its contact mechanism, but also as a detent for retaining the timing member in the position to which it was advanced by the particular oscillating unit and holding it therein until the next oscillating unit comes into action for imparting a similar advance operation with another set of teeth of the two ratchet wheels 35—1 and 35—2 of the timing member.

Electric timing devices of the type described above in connection with Fig. 4 may be provided with a larger number of mechanical oscillating units 30 for imparting to its timed shaft member 36—1 the desired timing action. Assuming that F is the frequency of the alternating-current power system and $f$ is the resonant frequency of the mechanical oscillating unit, such as the oscillating unit 30, a timing device of the type shown in Fig. 4 may be operated with any number of oscillating units 30 as long as their number is an integral factor of $F/f$. Thus, the timing device shown in Fig. 4, designed for operation on a 60-cycle alternating-current power system, with mechanical oscillating units 30 having a resonant frequency of 4 cycles per second, may be designed for operation with more than three oscillating units 30, as long as their number is an integral factor of $60/4=15$, such as 3, 5, or 15. By increasing the number of oscillating units used in such a device, the driving forces imparted to the common timed member shaft 36—1 are correspondingly multiplied and rendered more nearly continuous.

There are many applications requiring a timing device 10 similar to that of Fig. 1 has an actuating winding 16 and energizing contacts 21, 22 for controlling the energization of the winding from an energizing circuit similar to that described in connection with Fig. 1, including a dry cell 72, resistor elements 73, 76, 77, and a rectifier 78 arranged so as to supply proper components of the D. C. voltage and the A. C. voltage to the actuating winding 12 whenever the contacts 21, 22 are closed.

The timing mechanism also includes the oscillating member having an oscillating shaft 11 to which is connected one end of a hair spring 13 proportioned so that it may be adjusted to form with the mass of the elements of the oscillating system an oscillating system having a resonant frequency at which the timing device operates in synchronism with the corresponding frequency of the A. C. supply source. With the mechanical oscillating system so adjusted, the timing mechanism will provide a timing action which is substantially in synchronism with the A. C. supply source even if it is only energized from the D. C. source, and thus keep the desired correct time.

Control means are also provided to assure that whenever the timing device, while operating with D. C. only, has its circuit connected to the A. C. supply line, the control means modify the resonant frequency of the mechanical oscillating system so that its frequency is slightly below synchronism in order to assure that the action of the A. C. current impulses supplied to the actuating windings effect stable synchronization of the timing device in the manner described in connection with the timing axis T-4 of Fig. 2.

In Fig. 3, the control means are shown formed of a bimetallic member 91 held suitably anchored at 92 and carrying at its free end an abutment member 93 arranged so that when the bimetallic member 91 is in normal non-heated condition, the abutment projection of the abutment member 93 engages the hair spring 13 in which condition the hair spring 13 is adjusted to have the required normal stiffness for assuring that it forms with the oscillating masses an oscillatory system having a resonant frequency at which the timing device operates substantially in synchronism with the A. C. supply source.

The bimetallic element 91 is suitably combined with a resistor element 94 connected in circuit with the A. C. supply connections to the timing device as indicated, so that whenever A. C. energy is supplied to the energizing circuit of the timing device, the resistance element 94 will be energized, thereby raising its temperature as well as the temperature of the bimetallic element with which it is associated. The bimetallic element 91 with the resistor heating element 94 connected thereto are so designed that when the resistor element is energized by A. C. through the circuit from the supply terminal 75, the heated bimetallic element 95 will undergo a deformation causing it to remove the abutment member 93 from engagement with the hair spring 13, thereby decreasing its stiffness and thus causing the resonant frequency of the mechanical oscillating system of the timing device to be slightly reduced below the frequency corresponding to the A. C. supply line for assuring stable synchronization of the timing device in the manner explained above.

Since a bimetallic element 91 interconnected with a heating resistor 94 for securing a mechanical control action in response to the change in the temperature of the bimetallic element are well known in the art, a specific description of the constructional features of the bimetallic element 91 and of the resistance element 94 need not be given here. As is well known, such thermally responsive control devices require compensation for changes in the ambient temperature under which they operate and the control device of Fig. 3 is shown provided with such compensation means. To this end, another bimetallic element 91—1 similar to the bimetallic element 91 is shown connected to its ends by spacer elements and they are arranged so that when both bimetallic elements 91, 91—1 are subjected to equal changes in the temperature, the abutment member 93 will not be moved from its desired position.

In Fig. 3–A is shown a timing device of the invention designed for simultaneous energization by A. C. and D. C. and provided with another form of control arrangement for assuring that when the A. C. source is disconnected, its mechanical oscillating system will maintain the oscillating system of the timing device substantially in synchronism with the corresponding frequency of the A. C. supply and assure that when the timing device is connected both to the D. C. and A. C. energy source, the mechanical oscillating system of the timing device will be slowed down to make it possible for the A. C. impulses to exert a stable synchronizing action.

The timing device 10 of Fig. 3–A is shown provided with an oscillating member having an oscillating shaft 11 carrying the roller table 33 with the pawl 31, as in the arrangement of Fig. 1. The timing device is also shown provided with an actuating winding 16 arranged to be energized whenever the contacts 21, 22 are closed to momentarily complete an energizing circuit.

In the arrangement of Fig. 3–A, a dry cell 72 connected in series with a resistor 73 to the instrument terminals 70 provides the D. C. energy supply as in Fig. 1. The A. C. voltage component of the proper value is derived by connecting between the terminal 70 and the A. C. supply terminals 75 a step-down transformer 77—1, the secondary winding of which is connected in series with a rectifier 78 to the instrument terminals 70 so as to impress on the actuating windings 16 rectified A. C. impulses of the same polarity as the D. C. impulses supplied thereto by the D. C. cell 72. In order to provide the desired control action, the roller table which is of conducting material, such as copper, is arranged to move between two legs of a magnetic core member 96 provided with an exciting coil 97 connected in series with the A. C. supply leads to the transformer 77—1 so that whenever alternating energy is supplied to the transformer the exciting coil of the core 96 will be energized.

As a result, the legs of the core 96 will produce in the air gap between its legs within which the electrical conducting roller table oscillates an alternating magnetic field which will exert a damping action tending to reduce the amplitude of the oscillations of the mechanical oscillating system whenever the instrument is supplied with alternating current energy. This damping action exerted on the oscillating system will subject it to a slowing down action and will make it possible for the alternating current impulses supplied to the actuating winding to exert the desired stabilizing action required to maintain the timing device in synchronism with the D. C. supply frequency in the manner described in connection with the axis T-4 of Fig. 2.

ing device capable of delivering a substantial power at a timed rate. Among such applications are large clocks such as tower clocks, and applications such as recording instruments utilizing a paper roll advanced at a timed rate for recording thereon a varying quantity, for instance, the varying voltage or power output of an electric power system.

In accordance with one phase of the invention, a timing device which delivers a substantial power at a timed rate to a shaft, for instance, of a recording device, is arranged to be driven by a power source—such as an electric motor connected to an electric power supply system, or by power from an energy-storing device such as a spirally wound, energy-storing spring means—the power source being connected to a timed member of the timing device through a motion transmission mechanism for applying to the timed member driving forces of substantial power tending to rotate the timed member, and in combination therewith a timing unit, including an electrically actuated, mechanical oscillating unit for controlling the rate at which said transmission mechanism applies driving power to the timed member, the oscillating unit being connected to the transmission mechanism through preventive means such as a worm-gear connection arranged so as to prevent the transmission mechanism from applying driving forces to the oscillating unit.

Fig. 4-A shows diagrammatically one form of such timing device arrangement exemplifying the invention.

A device which is to be driven at a timed rate and requiring substantial driving power is indicated in Fig. 4-A by a shaft 2—11. The shaft 2—11 may represent, for instance, a timed shaft member of a transmission mechanism through which driving power is supplied to a paper roll of a recording mechanism used for recording the voltage variations of an electric power supply system, such recording devices being well known and requiring no further description. Driving power for rotating the timed shaft member 2—11 is delivered by an energy-storing means indicated in the form of a spiral spring 2—12 held enclosed in a spring housing 2—13.

The spring housing 2—13 is provided with a driving gear 2—14 meshing with a gear pinion 2—15 affixed to the timed shaft 2—11 so as to apply to the timed shaft 2—11 driving forces tending to rotate the shaft and the timing device connected thereto. The outer end of the spiral drive spring 2—12 has its end connected to the periphery of the spring housing 2—13 by conventional means, such as a pin 2—16. The inner end of the spring is connected to a hub 2—17 revolvably held within the housing and serving to wind the spring for storing driving energy therein. The hub 2—17 is affixed to a shaft 2—21 to which is secured a ratchet 2—22 cooperating with a conventional pawl 2—23 pivotally held on a wall of the spring housing so as to permit winding of the spring by inserting a key into a keyhole 2—24 of the winding shaft 2—21, the pawl and ratchet elements operating in a conventional way to retain the spring in the wound condition.

Provision is also made to assure that the driving spring is at all times maintained in wound condition. As indicated in Fig. 4-A, an electric motor 2—25 of the conventional type is arranged to drive a rotatably mounted rotor 2—26 which is connected through a shaft and worm 2—27 to a worm-gear 2—28 shown affixed to the winding shaft 2—21 of the driving spring. The electric motor 2—25 and its worm-gear connection to the spring winding shaft 2—21 are so arranged that the motor rotor 2—26 tends at all times to rotate the winding shaft 2—21 in the direction required in order to keep the spring wound.

The electric motor 2—25 may be of a conventional type. It comprises a rotor 2—26 formed, for instance, of a circular disk member of conducting material arranged to rotate so that a portion of its periphery passes through a gap separating the pole ends 2—27 of a laminated magnetic core 2—28 having mounted thereon an energizing winding 2—29 which is energized with alternating current through its connection to the power supply terminals 75. The core 2—28 has the usual shaded poles 2—27 for producing in the gap phase-displaced alternating field regions which impart to the conducting rotor disk 2—26 the required rotary motion.

In order to assure that the power drive means, such as the spring drive mechanism 2—10 or the electric motor 2—25, or both, drives the timed shaft member 2—11 of the timing device at the required timed rate, an element of the transmission mechanism—in the present case, the drive pinion 2—15 of the shaft—is connected through a gear train, generally designated 2—30, to an electrically actuated timing device, such as the electrically actuated timing and oscillating unit 30 of the type described in connection with Fig. 1. In Fig. 4-A, the gear train connection 2—30, between the timing oscillating unit 30 and the timed drive shaft 2—11, includes a worm 2—31 affixed to the ratchet shaft 36 of the timing oscillating unit 30, the worm 2—31 engaging a worm gear 2—32 which, in turn, is connected through a pinion 2—33 and a gear 2—34 engaged thereby, the gear 2—34 being affixed to the drive shaft 2—11 of the power-driven timed device to which gear 2—34 is secured. The worm gear elements interposed between the timing unit 30 and the power drive element 2—11 of the timing device form a one-way drive connection arranged so as to assure that the drive shaft 2—11 drives the timed device connected thereto at the required timed rate, while preventing the power transmission mechanism, including the shaft 2—11, from transmitting to the timing device 30 any forces tending to disturb or affect its timing action. In other words, by providing between the small-power timing device 30 and the large-power transmission mechanism which drives the timed shaft 2—11, preventive means in the form of a one-way worm-gear drive connection, the small-power timing device 30 is able to control the rate at which the large-power drive mechanism supplies the driving power at a timed rate to the timing device of shaft 2—11, while preventing the power transmission mechanism from applying driving forces to the small-power timing device.

The worm 2—31 and the associated worm gear 2—32 are designed to operate with a relatively steep worm pitch, the pitch being just below the pitch at which the worm gear 2—32 would be able to impart to the worm 2—31 forces tending to rotate the worm and the shaft 36 of the timing device connected thereto. With this arrangement, the shaft 36 of the timing device has to apply only small control forces to the worm gear connection 2—31 and 2—32 for exerting the time control action on the power transmission mechanism of the timing device, while at the same time assuring that the power transmission mechanism is unable to disturb the operation of the timing device.

The mechanical and the electrical actuating elements of timing devices of the invention of the type shown diagrammatically in Fig. 1, and in the other figures, may be readily assembled and mounted in their operative position between parallel mounting or plate-like frame members in accordance with the standard practice used in the construction of spring-driven timing devices, such as pocket watches or larger size clocks.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a timing device having an electrically actuated timing mechanism adapted to operate with energy from an alternating current power system of timed power frequency and also from a source of direct current: a substantially balanced mass structure mounted for oscillatory motion about a central balance axis in opposite directions from a mid-position; spring means forming with said mass structure an oscillating balance unit having a predetermined natural period timing frequency which is a submultiple of said power frequency; said balancing unit including a symmetrical permanent magnet member having at least one pair of peripheral poles for producing a magnetic field of a predetermined field axis in external field regions along said poles; actuating windings extending through said field regions and an energizing circuit including two terminal leads through which said windings are connected to said alternating current power system, and said energizing circuit also including a direct-current source and a switch unit serially connected between said two terminal leads and said windings; said switch unit including a flexible spring contact member and actuating means actuated by the oscillatory motion of said balance unit for causing said contact member to complete said energizing circuit during a torque interval which is a fraction of a half-cycle duration of said oscillatory motion and thereby impart to said magnet member a driving torque impulse during a fraction of an interval in said one direction; the natural period frequency of said balance unit being slightly less than said sub-multiple frequency; and additional impulse means including an additional independent spring element and at least one additional impact element positioned to come into impact engagement during a portion of at least one-half cycle oscillation of said balance unit when operating with energy from said power system for increasing the rate of said oscillations to said submultiple frequency.

2. In a timing device having an electrically actuated timing mechanism adapted to operate with energy from an alternating current power system of timed power frequency and also from a source of direct current: a substantially balanced mass structure mounted for oscillatory motion about a central balance axis in opposite oscillatory directions from a mid-position; spring means forming with the said mass structure an oscillating balance unit having a predetermined natural timing frequency which is substantially a submultiple frequency of said power frequency; said balancing unit including a symmetrical permanent magnet member having at least one pair of peripheral poles for producing a magnetic field of a predetermined field axis in external field regions along said poles; actuating windings extending through said field regions and an energizing circuit including two terminal leads through which said windings are connected to said alternating current power system, and said energizing circuit also including a direct current source and a switch unit serially connected between said two terminal leads and said windings; said switch unit including a flexible spring contact member and actuating means actuated by the oscillatory motion of said balance unit for causing said contact member to complete said energizing circuit during a torque interval which is a fraction of a half-cycle duration of said oscillatory motion and thereby impart to said magnet member a driving torque impulse during a fraction of an interval of said oscillatory directions; said energizing circuit being free from any rectifier means and being also free from power voltage transformer means, and free from switch means other than said switch unit, and said direct current source being at all times serially connected with said terminal leads; the natural period frequency of said balance unit being slightly less than said sub-multiple frequency; and additional impulse means including an additional independent spring element and at least one additional impact element positioned to come into impact engagement during a portion of at least one half cycle oscillation of said balance unit when operating with energy from said power system for increasing the rate of said oscillations to said submultiple frequency.

3. In a timing device having an electrically actuated timing mechanism adapted to operate with energy from an alternating current power system of timed power frequency and also from a source of direct current: a substantially balanced mass structure mounted for oscillatory motion about a central balance axis in opposite oscillatory directions for a mid-position; spring means forming with said mass structure an oscillating balance unit having a predetermined natural period timing frequency which is substantially a submultiple frequency of said power frequency; said balancing unit including a symmetrical permanent magnet member having at least one pair of peripheral poles for producing a magnetic field of a predetermined field axis in external field regions along said poles; actuating windings extending through said field regions and an energizing circuit including two terminal leads through which said windings are connected to said alternating current power system, and said energizing circuit also including a direct current source and a switch unit serially connected between said two terminal leads and said windings; said switch unit including a flexible spring contact member and actuating means actuated by the oscillatory motion of said balance unit for causing said contact member to complete said energizing circuit during a torque interval which is a fraction of a half-cycle duration of said oscillatory motion and thereby impart to said magnet member a driving torque impulse during a fraction of an interval in one of said oscillatory directions; said energizing circuit being free from any rectifier means and being also free from power voltage transformer means, and free from switch means other than said switch unit, and said direct current source being at all times serially connected with said terminal leads; a revolvably mounted timed member having a peripheral actuating region; and a push member pivotally carried by said balance unit at a pivot axis relatively distant from said balance axis, and having a push end relatively near said pivot axis arranged to momentarily engages a portion of the peripheral actuating region of said timed member for advancing it by a short step during an advancing interval which is of the order of duration of said torque interval, said switch unit being closed and opened each time said timed member is advanced one step.

4. In a timing device as claimed in claim 1, a revolvably mounted timed member having a peripheral actuating region; and a push member pivotally carried by said balance unit at a pivot axis relatively distant from said balance axis and having a push end relatively near said pivot axis arranged to momentarily engage a portion of the peripheral actuating region of said timed member for advancing it by a short step during an advancing interval which is of the order of duration of said torque interval, said switch unit being closed and opened each time said timed member is advanced one step.

5. In a timing device as claimed in claim 2, a revolvably mounted timed member having a peripheral actuating region; and a push member pivotally carried by said balance unit at a pivot axis relatively distant from said balance axis, and having a push end relatively near said pivot axis arranged to momentarily engage a portion of the peripheral actuating region of said timed member for advancing it by a short step during an advancing interval which is of the order of duration of said torque interval, said switch unit being closed and opened each time said timed member is advanced one step.

6. In a timing device as claimed in claim 1, said windings, said balance unit, said switch unit and the other elements associated with said balancing unit being so designed and correlated in their operation to the frequency of the power system that at intervals substantially equal to the one-cycle oscillating period of the oscillatory unit the switch unit operates to supply to the windings a series of discontinuous half waves of current from the power system.

7. In a timing device as claimed in claim 2, said windings, said balance unit, said switch unit and the other elements associated with said balancing unit being so designed and correlated in their operation to the frequency of the power system that at intervals substantially equal to the one-cycle oscillating period of the oscillatory unit the switch unit operates to supply to the windings a series of discontinuous half waves of current from the power system.

8. In a timing device as claimed in claim 1, said balance unit, said switch unit and the other elements associated with said balancing unit being so designed and correlated in their operation to the frequency of the power system that at intervals substantially equal to the one-cycle oscillating period of the balance unit the switch unit operates to supply to the windings a series of discontinuous half waves of current from the power system; said energizing circuit being so arranged and designed that when the power system is connected thereto the windings receive the major part of electric actuating energy from the power system and that when the energy from the power system is not available the direct current source will supply the windings with electric energy required to maintain the timed oscillatory motion of the balance unit.

9. In a timing device as claimed in claim 2, said balance unit, said switch unit and the other elements associated with said balance unit being so designed and correlated in their operation to the frequency of the power system that at intervals substantially equal to the one-cycle oscillating period of the balance unit the switch unit operates to supply to the windings a series of discontinuous half waves of current from the power system; said energizing circuit being so arranged and designed that when the power system is connected thereto the windings receive the major part of electric actuating energy from the power system and that when the energy from the power system is not available the direct current source will supply the windings with electric energy required to maintain the timed oscillatory motion of the balance unit.

10. In a timing device as claimed in claim 3, said windings, said balance unit, said switch unit and the other elements associated with said balancing unit being so designed and correlated in their operation to the frequency of the power system that at intervals substantially equal to the one-cycle oscillating period of the oscillatory unit the switch unit operates to supply to the windings a series of discontinuous half waves of current from the power system.

11. In a timing device as claimed in claim 3, said balance unit, said switch unit and the other elements associated with said balance unit being so designed and correlated in their operation of the frequency of the power system that at intervals substantially equal to the one-cycle oscillating period of the balance unit the switch unit operates to supply to the windings a series of discontinuous half waves of current from the power system; said energizing circuit being so arranged and designed that when the power system is connected thereto the windings receive the major part of electric actuating energy from the power system and that when the energy from the power system is not available the direct current source will supply the windings with electric energy required to maintain the timed oscillatory motion of the balance unit.

BENJAMIN H. SMITH.

REFERENCES CITED

The following references are of record in the file of this patent:

UNITED STATES PATENTS

| Number | Name | Date |
| --- | --- | --- |
| 1,920,479 | Poole | Aug. 1, 1933 |
| 2,025,894 | Poole | Dec. 31, 1935 |
| 2,183,062 | Conrad | Dec. 12, 1939 |

FOREIGN PATENTS

| Number | Country | Date |
| --- | --- | --- |
| 332,159 | Great Britain | July 17, 1930 |
| 378,511 | Great Britain | Aug. 15, 1932 |
| 440,257 | Great Britain | Dec. 20, 1935 |
| 464,899 | Great Britain | Apr. 27, 1937 |
| 523,885 | France | Apr. 30, 1921 |
| 526,211 | France | June 27, 1921 |